L. J. CREPLET.
MEANS FOR CONTROL OF ENGINES OR APPARATUS.
APPLICATION FILED FEB. 14, 1919.
1,412,271.  Patented Apr. 11, 1922.
3 SHEETS—SHEET 1.
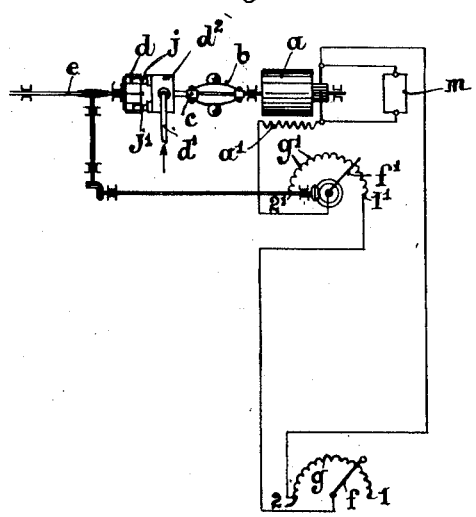
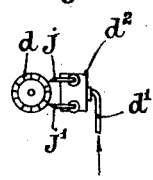
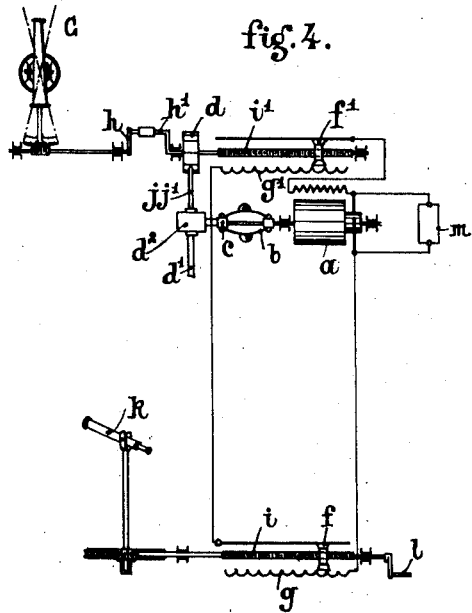
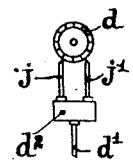
INVENTOR:
Léon Joseph Creplet,
By Attorneys, L. J. CREPLET.
MEANS FOR CONTROL OF ENGINES OR APPARATUS.
APPLICATION FILED FEB. 14, 1919.

1,412,271.

Patented Apr. 11, 1922.

INVENTOR:
Léon Joseph Creplet,
By Attorneys,

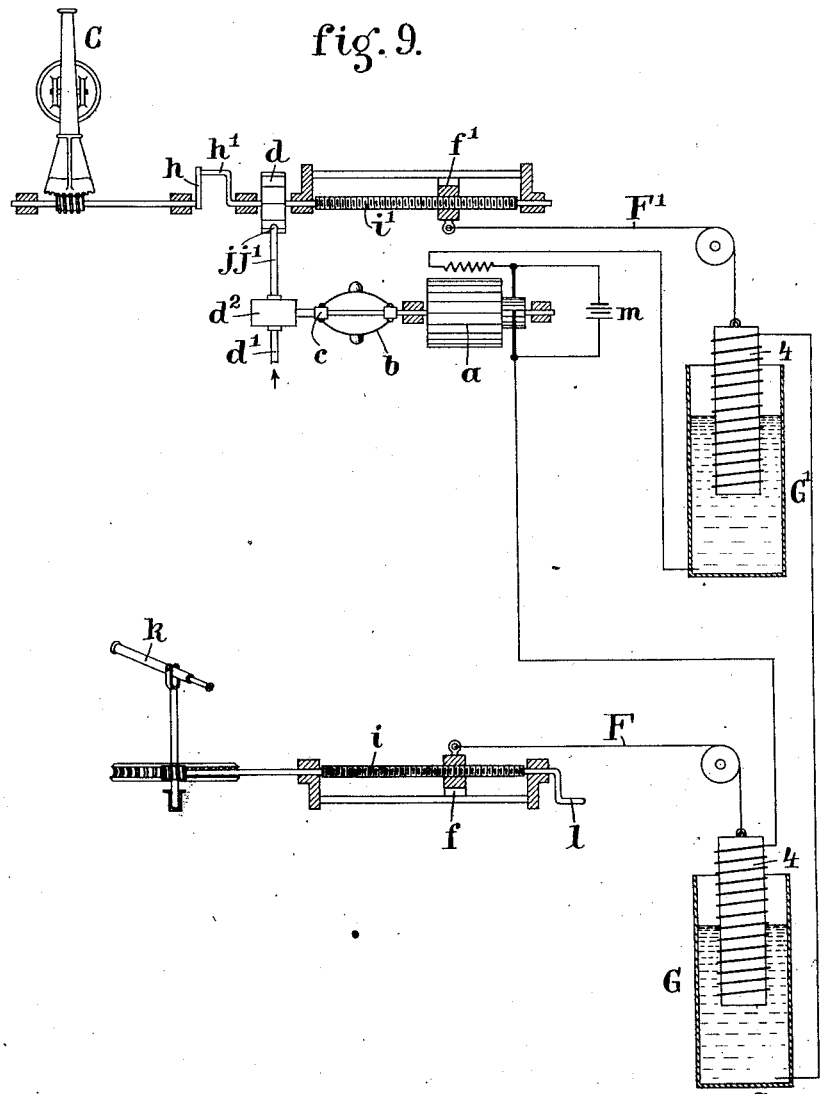

UNITED STATES PATENT OFFICE.

LÉON JOSEPH CREPLET, OF PARIS, FRANCE.

MEANS FOR CONTROL OF ENGINES OR APPARATUS.

1,412,271.  Specification of Letters Patent.  Patented Apr. 11, 1922.

Application filed February 14, 1919. Serial No. 277,114.

(GRANTED UNDER THE PROVISIONS OF THE ACT OF MARCH 3, 1921, 41 STAT. L., 1313.)

*To all whom it may concern:*

Be it known that I, Léon Joseph Creplet, a subject of the Kingdom of Belgium, residing in Paris, France, have invented certain new and useful Improvements in Means for Control of Engines or Apparatus, (for which I have filed applications in France, filed August 25, 1916, patented October 2, 1920, published January 7, 1921, No. 511,936; Great Britain, filed November 4, 1918, complete accepted April 1, 1920, patent sealed June 17, 1920, No. 140,488; Italy, filed October 19, 1918, No. 274/1983; Switzerland, filed July 17, 1919, registered October 31, 1921, No. 92,850; Spain, filed July 19, 1919, patented October 17, 1919, No. 70,403; Germany, filed March 30, 1921, No. C. 30,384,) of which the following is a specification.

The application for a patent in the United States of America Serial No. 128489 filed on the 30th of October, 1916, relates to the combination of a centrifugal force governor operated by an electric motor with a machine for effecting the regulation thereof.

The present invention makes use of the parts therein described, i. e. a centrifugal force governor and an electric motor for operating from a distance any engine having a limited movement.

By suitably connecting the above governor to the governor of a steam engine for example, a fixed opening of the throttle will correspond to each position of the sleeve of the governor.

If the motor of the governor is shunt excited, it will suffice to modify its excitation by the operation of a rheostat in order to obtain all the degrees of opening of the throttle.

If the governor is connected to a rudder, a fixed position of the tiller or steering wheel will correspond to each position of the sliding contact of the rheostat.

When the operation requires a considerable amount of force, the governor acts through the medium of a servo motor of any kind.

In these various applications, use is made of a governor, the sleeve of which travels over the whole of its course by means of a considerable variation of speed, 50—100—200% which enables great sensitiveness to be obtained.

When the regulation of the receiver does not require this latter to be arrested in intermediate positions, the rheostat has only two terminals and a single resistance, which an interrupter puts into circuit or short circuits. Such is the case of the reversing throttle, the rudder of torpedoes and the like. In the latter case, the operation may be effected by means of wireless telegraphy, since it consists simply in closing and opening an interrupter.

All these applications require, as has been stated, a mechanical connection between the receiver and the governor and a certain variation of speed of this latter.

The following arrangement secures the same end by doing away with the mechanical connection of the sleeve to the receiver and causes this latter to traverse the whole of its course although the speed of the governor remains constant.

In the description which follows, reference will be made to the accompanying drawings which illustrate a suitable embodiment of the invention.

Figure 1 is a diagrammatic view of a system of control from a distance, according to the present invention;

Fig. 2 is a diagrammatic side view of so much of Fig. 1 as illustrates the servo-motor;

Fig. 4 is a diagrammatic view illustrating the application of the invention to the aiming of cannon;

Fig. 5 is a diagrammatic view of the servo-motor of Fig. 4;

Fig. 9 is a diagrammatic view corresponding to Fig. 4, illustrating the application of the invention with the rheostats of Figs. 6, 7 and 8.

Figure 3:
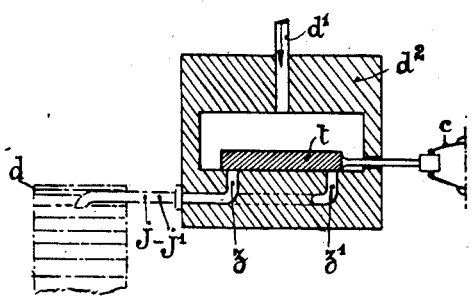
Fig. 3 is a sectional view, on a larger scale, of the valve or distributor of this motor.

In Figure 1, let *a* be the electric motor supplied from a source *m*, actuating the centrifugal governor *b* the sleeve *c* of which operates by a servo-motor *d* of any kind (such as a wheel with vanes worked by compressed air, as in the example, oil under pressure, a mechanical or electrical clutch or the like) a driven part *e* in one direction or the other, according as the governor speeds up or slows down.

The controlling or control transmitting member is rigidly connected (as will be described hereinafter) to the sliding contact $f$ of an excitation rheostat $g$ inserted in the circuit of the field magnet winding $a'$ of the motor $a$. A second rheostat $g'$ provided with a sliding contact $f'$ and identical with the first one as regards partial and total resistances, is connected mechanically to the driven part $e$ which it follows in its movements.

The whole is controlled in such a way that the sleeve $c$ occupies its mean positions in which the governor is inactive, when the two sliding contacts $f'$ and $f$ are parallel. The drawing shews that in this case, the sum of the two resistances in series is equal to the total resistance of one of the two rheostats.

If the transmitting member be moved, and consequently the sliding contact $f$ for example, towards $l$, the total resistance in series is augmented, the excitation current diminishes and the motor accelerates. The sleeve $c$ consequently moves and sets in action the servo motor. The receiving member is set in motion and drives $f'$ towards $L'$ the effect of which is to reduce the excitation resistance, to reinforce the magnetization and to reduce the speed. The movement ceases when the speed of the governor is reestablished, that is to say when the sliding contact $f'$ has again become parallel to the sliding contact $f$.

It will be readily seen that if the transmitter be moved so as to make $f$ move towards 2, the governor will slow down and the sleeve will cause the servo-motor to act in a different direction from the first. The receiver is set in motion and drives $f'$ towards 2, as long as the normal speed of the governor is not reestablished, that is to say as long as $f'$ has not yet set itself parallel to $f$.

The specific servo-motor shown is constituted as shown in Figs. 2 and 3, by a fan wheel or bladed turbine $d$ receiving jets of fluid, such as compressed air, from two nozzles $j$ $j'$, which act upon the wheel in opposite directions. The compressed air enters by a conduit $d'$ into the valve box $d^2$, in which is a suitable valve $t$ which is shown as a slide valve, and which controls two ports $z$ $z'$ which communicate respectively with the nozzles $j$ $i'$. In the middle position both parts are closed; if the speed augments or diminishes, the movement of the governor, connected at $c$ to a sleeve on the valve stem, displaces the valve so as to uncover one or the other of these ports, and compressed air is directed from one nozzle or the other against the wheel, causing it to turn in one direction or the other and thereby to correspondingly drive the driven part $e$ of the apparatus under control.

The present invention relates to all the applications above indicated, that is to say to the operation from a distance of all engines or apparatus having a limited movement. For certain apparatus such as projectors, cannons, reproducers of drawings and telemeters, which require two movements, the transmitting apparatus is double.

Figure 4 relates for example to the operation from a distance of a cannon C from an observation post suitably placed, and provided with a telescope $k$.

The operation of the cannon is effected by two cranks, one $h$ giving the traverse and the other the elevation. The control is by hand-operated cranks, that for the traverse being a crank $l$ or screw $i$.

In order to obtain the traversing movement, the crank $h$ is connected to the counter crank $h'$ of the servo motor. This counter crank $h'$ is operated for example by the fan wheel $d$ rigidly connected to a screw $i'$ having a nut carrying the sliding contact $f'$ of the rheostat $g'$. The two branches $j$ and $j'$ into which the sleeve $c$ of the governor leads the compressed air by means of a suitable distributor, when it departs from its standard speed, cause the fan wheel $d$ and the crank $h$ rigidly connected thereto to rotate in one direction or the other.

The sighting telescope $k$ is worked by the hand crank $l$ connected mechanically to the telescope. The crank $l$ in turning moves the sliding contact $f$ of the rheostat $g$ on the screw $i$, which produces (in the manner already explained with reference to Fig. 1) a movement in the same direction and to the same extent of the sliding contact $f'$ and consequently of the adjusting crank $h$. The telescope has a similar arrangement (not shown) for the elevating movement which is immediately transmitted to the cannon by a receiving apparatus analogous to the foregoing.

In the various applications of the invention use is made of shunt or independent excitation motors, the excitation resistance of which is modified by causing them to accelerate or slow down.

It is obvious that the same result may be obtained by acting upon a resistance placed in the armature circuit or by always modifying, by the changing of a resistance, any one of the elements which alters the speed of an electro-motor.

The choice of a shunt motor allows when the excitation circuit is not saturated, of rendering the speed independent of variations in the armature voltage and does not necessitate a source of current of constant tension.

In the different applications it is necessary that the rheostat of the apparatus which effects the transmitting, shall offer a minimum of friction to working. For this purpose, use may be made, (see Figure 6) of a resistance 3, wound upon a support 4 fixed to the end of a cord 5 the other end of which is securely attached to the transmitting apparatus. The support dips into a reservoir of mercury 6.

It will be understood that the resistance in circuit varies according as the resistance wire 3 dips, more or less, into the mercury, the resistance of which is negligible.

A system comprising broadly a bell 7, carrying a weight, overcomes the thrust of the mercury in such a way that the cord 5 is always kept taut.

Figure 6:
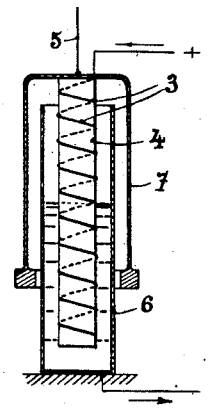
Fig. 6 is a vertical section illustrating in detail the rheostats.
Figures 7, 8:
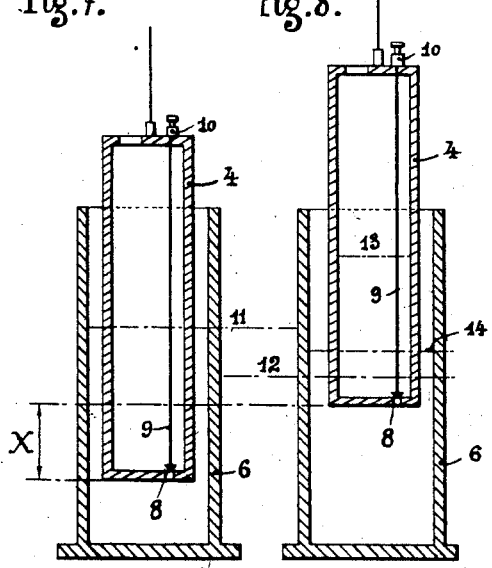
Figs. 7 and 8 are further sectional views illustrating the rheostat in different positions.

The complete apparatus, including the form of rheostat shown in Fig. 6, or the preferred form shown in Figs. 7 and 8, is illustrated in diagram in Fig. 9. This figure differs from Fig. 4 only in the form of rheostats and in the means for operating the rheostats. The nuts $ff'$, caused to travel by the screws $i\ i'$, instead of carrying brushes for varying the resistance of the rheostats $g\ g'$, are connected by the connector F or F' with the movable member 4 of the respective rheostats G G', these latter being of the construction shown in Fig. 6, or in Figs. 7 and 8. The screws $i\ i'$ have their threads so pitched that as the coil 4 of one rheostat rises, the coil 4 of the other rheostat G' descends, and vice versa. The effect in the balancing of the resistance is precisely the same as in the construction shown in the simpler diagrams of Figs. 1 and 4.

It should be noted that the motor $a$ (see Figure 1) of the receiver responds to the variations of speed imposed (each time that the sliding contact $f$ is displaced), with a certain delay.

This delay arises from two elements; the self induction of the circuit in which the rheostat $g$ is placed and the inertia of the motor.

For the purpose of diminishing this delay, a device is provided which exaggerates the variation of the resistance as soon as the transmitter is moved, to re-establish it to its real value afterwards. In this way the delay due to self induction on the one part and inertia on the other part are overcome by an impulse which afterward is immediately suppressed.

Figures 7 and 8 show the method of carrying out this requirement. Here the resistance element may be the same as the wire 3 in Fig. 6.

The support 4 of the resistance is an insulating tube closed at its lower end but communicating with the bath of mercury by an opening 8 controlled by the needle 9, adjustable by a screw 10.

When the apparatus is in equilibrium, the level 11 of the mercury is the same inside and outside the tube 4 (see Figure 7). Let it be supposed that the tube be raised abruptly by the amount X. The mercury contained in 4 will not have time to escape, so that the extreme level will descend in 6 from 11 to 12, putting into circuit the portion of the resistance limited by the level 12 (see Figure 8).

Finally, in proportion as the mercury flows out by the hole 8 of the needle valve, owing to the difference of level 13—12, the outer level ascends, stopping at 14 when equilibrium is re-established.

It will also be seen that if the object of the working of the transmitter is to cause the tube 4 to descend, the effect of this will be to reduce the resistance in series, at the commencement of the movement and the portion of the resistance suppressed is augmented, to re-establish itself afterwards at the end of a time adjustable by the screw 10.

What I claim and desire to secure by Letters Patent of the United States is:—

1. Means for the control from a distance of an apparatus having a limited movement, comprising, in combination with such controlled apparatus, a centrifugal governor, an electric motor driving it, such controlling device of such controlled apparatus connected to said governor to be operated according to the speed thereof, and a rheostat operated by the controlled apparatus introduced in the circuit of said motor to modify the speed of the motor, and means at the distant point for varying the current in said circuit.

2. The combination of claim 1, the means at the distant point for varying the current in said circuit being a rheostat.

3. The combination of claim 2, the electric motor being shunt excited, with its field-exciting coil in a circuit extending to the distant point, and the two rheostats connected serially in said circuit.

4. The combination of claim 2, the two rheostats being connected in series, one of them being operated from the remote controlling point and the other connected to the controlled apparatus, said rheostats acting conjointly to control the speed of the motor, the mean speed thereof corresponding to a normal total resistance of said rheostats, and any variation of the controlling rheostat causing a change in speed which through said governor causes a movement of the controlled apparatus and of the other rheostat in direction to restore such normal total resistance.

5. The combination of claim 4, each rheostat having a total resistance equal to their normal combined total resistance.

6. The combination of claim 1, the motor having a shunt-excited non-saturated magnetic field, whereby its control is unaffected by variations in voltage of the source of current.

7. The combination of claim 1, with a power-actuated apparatus controlled by the governor and acting to drive the controlled apparatus in either direction according as the speed of the governor varies from the normal.

8. The combination of claim 7, the power apparatus being a motor in the nature of a pilot engine.

9. The combination of claim 7, the power apparatus being a fluid-propelled servo-motor.

10. The combination of claim 9, the servo-motor comprising a fan wheel, jet nozzles for turning such wheel in either direction, and a distributor operated by the governor for directing fluid under pressure to either nozzle.

11. The combination of claim 1, the rheostat comprising a movable resistance element and a bath of mercury in which said element is more or less submerged.

12. The combination of claim 2, with means for annulling the retarding effect due to the inertia of the motor of the governor and to the self induction of the circuit controlled by the rheostat of the transmitter, comprising means for temporarily exaggerating any change of resistance of the transmitting rheostat, with retarding means for eliminating such exaggeration after a suitable interval.

13. The combination of claim 12, with an adjustment for such retarding means.

14. The combination of claim 12, such means comprising a mercury bath, and a member movable with the transmitting control, and engaging the mercury to primarily change the mercury level to accentuate the difference of resistance with a given movement, and means for restoring the mercury level independently of movement of such member.

15. The combination of claim 11, the rheostat comprising a movable member forming a vessel receiving part of the mercury of such bath, with an orifice through which the mercury may flow into or from said vessel.

16. The combination of claim 15, with adjusting means for varying the area of such orifice.

In witness whereof, I have hereunto signed my name.

LÉON JOSEPH CREPLET.